United States Patent [19]

Stelzer

[11] 3,734,570
[45] May 22, 1973

[54] PROPORTIONING DEVICE
[75] Inventor: William Stelzer, Milford, Mich.
[73] Assignee: Kelsey-Hayes Company, Romulus, Mich.
[22] Filed: Sept. 2, 1970
[21] Appl. No.: 68,895

[52] U.S. Cl............303/6 C, 137/505.25, 137/508
[51] Int. Cl. ............................B60t 8/26, B60t 11/34
[58] Field of Search......................303/6 C; 188/349; 137/505.25, 508, 493.6; 60/545 E

[56] References Cited
UNITED STATES PATENTS

| | | | |
|---|---|---|---|
| 2,804,881 | 9/1957 | Seid et al. | 137/508 X |
| 3,211,175 | 10/1965 | Replogle | 137/508 X |
| 3,508,792 | 4/1970 | Bueler | 303/6 C |
| 3,547,498 | 12/1970 | Bueler | 303/6 C |
| 3,612,618 | 10/1971 | Swanson | 303/6 C |

Primary Examiner—Duane A. Reger
Attorney—Harness, Dickey & Pierce

[57] ABSTRACT

A device for varying the proportion of brake pressure delivered to the front and rear brakes of a vehicle having a differential area piston for modulating the brake pressure delivered to the rear brakes after a certain inlet pressure is reached, and an additional member cooperating with the differential piston to provide a fixed offset between the pressure delivered to the front and rear brakes after a certain differential between front and rear brake pressures is reached.

18 Claims, 3 Drawing Figures

PATENTED MAY 22 1973 3,734,570
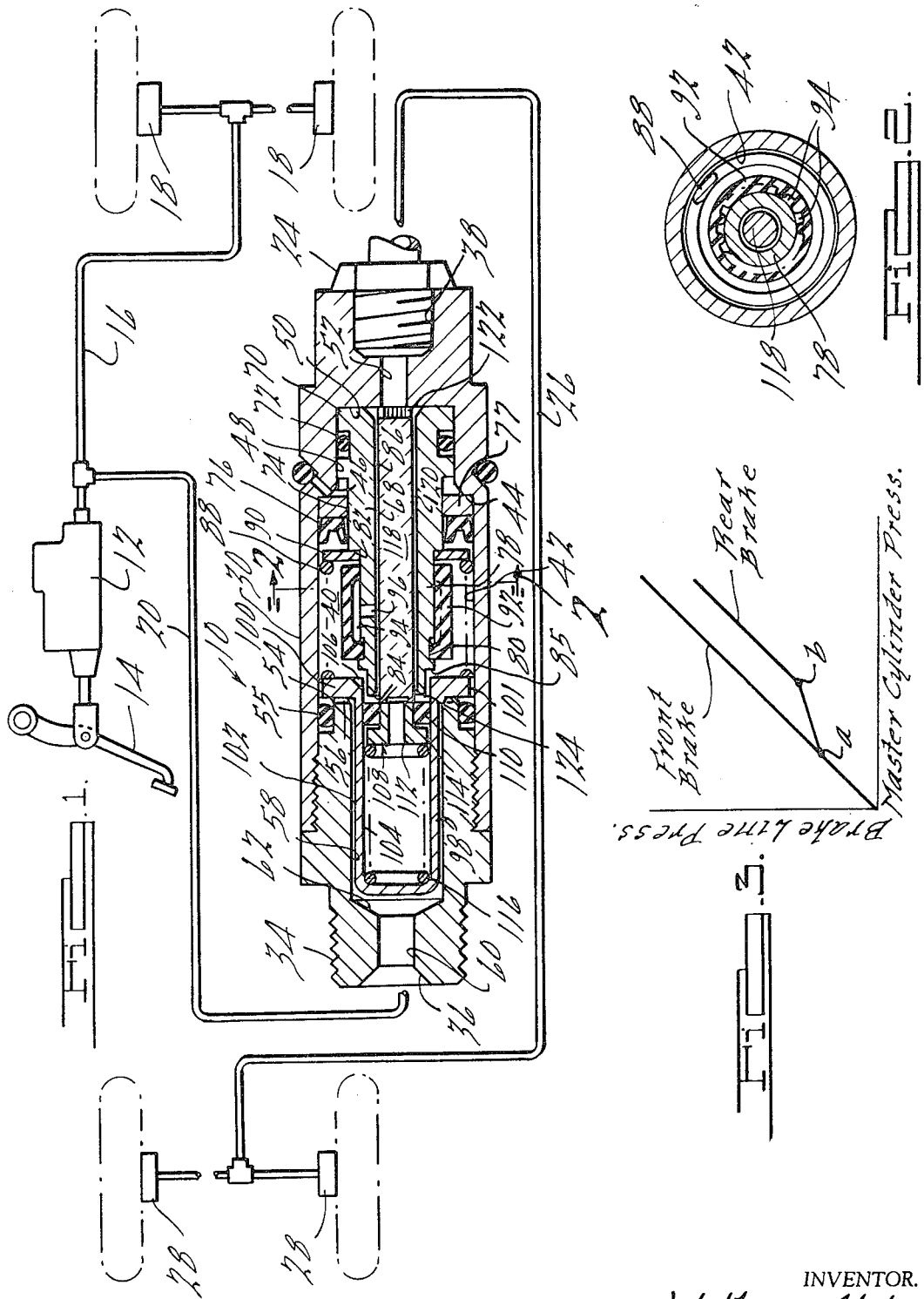
INVENTOR.
William Stetzer.
BY Harness, Dickey & Pierce
ATTORNEYS.

PROPORTIONING DEVICE

CROSS REFERENCE TO RELATED APPLICATIONS

The present invention relates generally to the invention disclosed in the application by David T. Ayers entitled PROPORTIONING DEVICE, Ser. No. 66,250, filed Aug. 24, 1070; and my application entitled PROPORTIONING DEVICE, Ser. No. 68,896, filed Sept. 2, 1970, both of which are assigned to the assignee of this application.

BACKGROUND OF THE INVENTION

1. Field of the Invention

Proportioning devices for vehicle hydraulic brake systems.

2. Description of the Prior Art

It is well-known that the proportion of a vehicle's weight that is borne by the front and rear wheels of the vehicle does not remain static. As the vehicle is braked, the weight borne by the rear wheels decreases and the weight borne by the front wheels increases. The change in weight is dependent upon the magnitude of the deceleration. In recognition of this fact, various proportioning devices have heretofore been proposed which are responsive to master cylinder outlet pressure, and which serve to limit the brake pressure applied to the rear wheels upon the attainment of a predetermined master cylinder outlet pressure. Under certain conditions of very high master cylinder outlet pressure, for example, in the case of front brake line failure or extreme brake fade at the rear brakes, it is desirable to bypass the proportioning valve to permit the brake pressure delivered to the brakes at the rear wheels to increase at a rate higher than that ordinarily permitted by the proportioning device such that the rear brakes have adequate line pressure to stop the vehicle. This has been accomplished by a bypass valve connected in parallel with the proportioning valve which opens above a predetermined master cylinder pressure so as to circumvent the proportioning valve.

SUMMARY OF THE INVENTION

The present invention provides a proportioning device, preferably inserted between the master cylinder and the rear wheel brake cylinders, for limiting the brake pressure applied to the rear wheels above a first predetermined master cylinder outlet pressure, and additionally, for limiting the brake pressure differential between the brake pressures delivered to the front and rear wheels above a second predetermined master cylinder outlet pressure. It will be appreciated that it is conventional to limit the pressure delivered to the rear wheel brake cylinder above a first rate of deceleration. To this end, a differential area piston is provided for proportioning the distribution of brake pressure delivered to the rear and front brakes from the first predetermined brake fluid inlet pressure (i.e., master cylinder outlet pressure) to a second predetermined brake fluid inlet pressure in the conventional manner. An additional increase in the fluid pressure offset between the rear and front brakes above the second predetermined brake fluid inlet pressure is prevented by providing an additional member cooperating with the differential area piston to appropriately alter its effect. Preferably, a substantially constant offset between the pressures delivered to the front and rear brakes is established above the second predetermined brake fluid inlet pressure. Therefore, it will be appreciated that above the second predetermined master cylinder outlet pressure, the pressure delivered to the rear brakes will be greater than that ordinarily provided by a proportioning device not having the additional member. In effect, the influence of the proportioning valve is lessened above the second predetermined master cylinder outlet pressure such that a separate bypass valve in the system is not required.

More particularly, the differential area piston is resiliently biased by a prestressed spring member so that movement of the piston in response to fluid forces acting on the differential areas thereof occurs only above the first predetermined brake fluid inlet pressure. One end of the piston constitutes a valve portion which engages a cooperating valve portion on the additional member upon movement of the piston to interrupt full fluid pressure communication between the inlet and the outlet of the device. Engagement and disengagement of the valve portions is effected to modulate the fluid pressure communicated to the rear brakes in the conventional manner. The additional member is also biased by a prestressed spring member for movement of the member in response to a differential pressure across the member which occurs above the second predetermined brake fluid inlet pressure. Movement of the additional member moves the valve portion thereon from the valve portion on the piston which causes abutment between the piston and the proportioning valve housing thereby preventing engagement of the valve portion on the piston and the additional member. Movement of the member provides a fixed pressure differential across the proportioning device. Thus, above the second predetermined brake fluid inlet pressure, the fluid pressure at the outlet of the proportioning device which is delivered to the rear brakes increases substantially at the same rate as the pressure at the inlet to the proportioning device.

BRIEF DESCRIPTION OF THE DRAWINGS

FIG. 1 is a cross-sectional view of a proportioning device according to this invention illustrated with respect to a conventional vehicle hydraulic braking system;

FIG. 2 is a cross-sectional view taken generally along the lines 2—2 of FIG. 1; and FIG. 3 is a graph illustrating the proportioning of brake pressure to the front and rear wheels which is provided by the device of FIG. 1.

DETAILED DESCRIPTION OF THE PREFERRED EMBODIMENT

In FIG. 1, a proportioning device 10 according to the present invention is illustrated. The proportioning device 10 is shown in its manner of connection in a hydraulic brake system for a passanger car or the like. The usual master cylinder is shown at 12 as being operated by a brake pedal 14 to deliver brake fluid directly through a conduit 16 to the front wheel brake cylinders 18. Fluid pressure is also delivered from the conduit 16 through conduits 20 and 26 to the rear wheel brake cylinders 28. The proportioning device 10 is interposed in the fluid connection to the rear brakes as between conduits 20 and 26 by means of an inlet fitting (not shown) and an outlet fitting 24. Thus, fluid pressure can be only transmitted to the rear brakes by passage through the proportioning device.

The proportioning device 10 includes a hollow housing or cylinder 30 which is closed at its inlet end by an end closure member 34 threaded to the housing 30. The end closure member 34 has an inlet opening 36 which is threaded to accept an inlet fitting, while the housing 30 has an outlet opening 38 into which the outlet fitting 24 is threaded. The housing 30 also has a central bore or chamber 40 which provides communication between the inlet opening 36 and the outlet opening 38. The bore 40 is symmetrical about its longitudinal axis and is of stepped diameter to provide axially successive bore portions of decreasing cross-sectional area with shoulders formed intermediate the bore portions. These bore portions and shoulders include a bore portion 42, an annular radial shoulder 44 having a chamfer 46, a bore portion 48, an annular radial shoulder 50, and an outlet bore portion 52. The end closure member 34 is provided with a stepped diameter portion 54 accepting an O-ring 55 sealingly engaging the bore portion 42 of the housing 30. The end closure member 34 is further provided with a bore portion 58, an inlet bore portion 60, and a tapered shoulder 62 intermediate the bore portions 58 and 60. For reasons to be apparent later, the right end of the end closure member 34 has a plurality of serrations 56 for allowing fluid flow therethrough.

A differential area piston or member 68 is carried within the bore 40, journalled to the bore portion 48, for axial reciprocatory movement therein. The piston 68 is provided with an enlarged cylindrical portion 70 at the right hand end thereof having an O-ring 72 sealingly engaging the wall of the bore portion 48. Similarly, a cylindrical portion 74 of lesser diameter to the left of the portion 70 is provided with an annular seal 76 sealingly engaging the wall of the bore portion 42. The seal 76 is located by an annular spacer 77 abutting the shoulder 44. A cylindrical portion 78, provided with a groove 80, is located to the left of the cylindrical portion 74 and is of still smaller diameter to form an annular radial shoulder 82 intermediate the cylindrical portions 74 and 78. At the left hand end of the differential area piston 68, a rounded blunt portion of reduced diameter 84 is provided in combination with a shoulder 85 spaced a predetermined axial distance from the blunt end portion 84. The piston 68 is also provided with a central bore 86 having a conical opening at its right hand end to provide communication therethrough. The piston 68 is biased to the right by a coil spring member 88 acting against a washer 90 which engages the shoulder 82 of the piston 68 such that the right hand end thereof abuts the radial annular shoulder 50 of the housing 30. An annular resilient member 92 engages the groove 80 of the piston cylindrical portion 78 to form a chamber 94 which communicates with the central passage 86 through a radial passage 96 in the piston 68. As can be best seen in FIG. 2, the annular resilient member 92 has a plurality of axially extending ribs circumferentially spaced along the internal cylindrical surface of the member 92 which defines spaces intermediate the ribs constituting the chamber 94. For reasons to be apparent hereinafter, the chamber 94 is contractible and expansible in accordance with the pressure differential across the annular resilient member 92.

The proportioning device 10 is provided with a cup member 98 having a radially outwardly extending flange 100, engaging the bore portion 42 of the housing 30 at its periphery, and held in engagement with the serrated portion 56 of the end closure member 34 by the coiled spring member 88. The flange 100 has serrations 101 at its periphery portion to permit flow thereby. The outside diameter of the cup 98 is smaller than the inside diameter of the bore portion 58 of the end closure member 34 to provide a flow passage 102 therebetween. The cup 98 has a bore 104 which is sealed at its left end and opens into the chamber 40 at its right end. The bore 104 is provided with a chamfer 106 at its right hand extending only partially about the bore 104.

The proportioning device 10 further includes a composite member 108 consisting of an annular resilient member 110 and a metallic sleeve member 112. The sleeve member 112 is provided with a flange 114 and is secured to the bore of the annular resilient member 110 by an interference fit therebetween. The resilient member 110 is journalled within the bore 104 of the cup 98 for axial reciprocatory movement of the composite member 108 therein. A coiled spring member 116 is positioned interiorly of the cup 98 and abuts the flange 114 of the sleeve member 112 to resiliently bias the composite member 108 to the right. Movement to the right of the composite member 108 is limited by a spacer member 118 positioned internally of the differential area piston 68 which abuts the sleeve member 112 at its one end and the shoulder 50 of the housing 30 at its other end. The spacer 118 is generally cylindrical and has an outside diameter which is less than the diameter of the bore 86 of the piston 68 to provide a flow passage 120 therebetween. The right end of the spacer 118, which abuts the shoulder 50, is provided with a plurality of serrations 122 which permit flow from the passage 120 to the outlet bore portions 52 of the housing 30.

The blunt end portion 84 of the piston 68 and the right hand face of the annular resilient member 110 form a valve indicated generally at 124 which is closable by axial movement of the piston 68 engaging the blunt end thereof with the composite member 108 to interrupt braking pressure transmission from the inlet opening 36 to the outlet opening 38 of the device 10.

During normal operation of the brakes when the master cylinder outlet pressure is not in excess of a predetermined amount, a fluid passage for the transmission of braking pressure is provided from the inlet opening 36 through the passage 102, the serrations 56 on the end closure member 34, the serrations 101 on the cup 98, the passage 120, the serrations 122 on the spacer 118, the outlet bore portion 52, to the outlet opening 38. Under such conditions, the proportioning device 10 has no effect upon the braking pressure delivered from the master cylinder 12 to the rear wheel brake cylinders 28. During braking, however, fluid pressure within the bore 40 acts upon the piston 68 producing a resultant force tending to move the piston 68 to the left against the spring 88. This action is produced by the fact that the shoulders and surface areas of the piston 68 exposed to fluid inlet pressure which face in a right hand direction are greater in total area than such surface areas and shoulders which face in a left hand direction. The spring 88 is precompressed such that the force tending to move the piston 68 in the left hand direction must reach a first predetermined level to overcome the spring 88 to initiate movement toward the left thereby further compressing the spring 88. Movement of the piston 68 toward the left results in engagement of the blunt end of the differential area piston 68 with the composite member 108 to interrupt the full transmission of braking pressure through the proportioning device 10. Accordingly, the proportion of the master cylinder brake pressure delivered to the rear wheel brake cylinders 28 is reduced. The differential area piston 68 engages and disengages the composite member 108 to modulate the braking pressure delivered to the rear brakes in the conventional manner until a second predetermined master cylinder pressure is reached. This operation is discussed in more specific detail in the patent to William Stelzer, U.S. Pat. No. 3,423,936, issued Jan. 28, 1969, and assigned to the assignee of this application.

When the second predetermined master cylinder pressure is reached, a force on the composite member 108 produced by a differential pressure across the member 108 causes movement of the member 108 to the left. The differential pressure arises by virtue of the fact that the surfaces facing to the left are exposed solely to the reduced pressure at the output of the proportioning device, 10, whereas a portion of the surfaces facing to the right are exposed to the higher pressure at the inlet 36 of the proportioning device 10, particularly, the portion of the resilient member 110 radially outward of the engagement of the blunt end of the piston 68 with the resilient member 110. The coiled spring member 116 is prestressed to allow movement of this composite member 108 to the left above the second predetermined inlet pressure to open the valve 124. Following movement to the left by the differential area piston 68 is limited by abutment of the shoulder 85 on the piston 68 with the flange 100 of the cup 98. This following movement is controlled by the relative axial positions of the blunt end 84, the shoulder 85 on the piston 68, and the flange 100 on the cup 98. Fluid flow by this abutment is provided by the chamfer 106 in the cup 98. The prestress of the coiled spring member 116 is established so as to provide a substantially constant pressure offset between the braking pressures delivered to the front and rear brakes, i.e., a fixed differential pressure across the proportioning device 10 is provided above the second predetermined inlet pressure.

The brake pressure proportioning performance of the proportioning device 10 can be more clearly seen with reference to the graph of FIG. 3. In FIG. 3, a graph of master cylinder pressure in relation to the pressure delivered to the front and rear brake cylinders is illustrated. As can be seen in the graph of FIG. 3, the front brake cylinders receive full master cylinder outlet pressure over the entire range of operation. The rear brake cylinders, on the other hand, receive full master cylinder pressure until a first predetermined master cylinder outlet pressure is reached at point *a*, often referred to as the "split point." At point *a*, the piston 68 moves to the left so as to close the valve 124 and to interrupt full fluid pressure transmission through the device 10. At a second predetermined master cylinder outlet pressure *b*, the pressure differential across the composite member 108 becomes sufficient to cause movement of that member to the left, and consequent abutment of the shoulder 85 of the piston 68 on the flange 100 of the cup 98. Movement of the composite member 108 to the left provides a lesser rate of diminution of brake pressure delivered to the rear wheels in response to increasing fluid pressure at the inlet 36. Preferably, above the second predetermined inlet fluid pressure *b*, the proportioning device 10 provides a substantially fixed pressure differential (a slope of 45°) between the pressures delivered to the front and rear wheel brake cylinders. When the operator releases the braking pressure delivered to the proportioning device 10, the chamber 94 formed by the annular resilient member 92 expands by virtue of the release of the pressure in the chamber 40 so as to allow a simultaneous pressure reduction at the outlet opening 38. This expansion of chamber 94 causes the pressure at the rear brake cylinders to more closely follow the plot of FIG. 3 for the rear brake pressure (shown for increasing master cylinder pressure) under a decreasing master cylinder pressure condition.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

What is claimed is:

1. A two stage proportioning valve for use in a vehicle hydraulic brake system comprising:

a housing having a fluid inlet adapted to receive fluid from a source of fluid pressure, a fluid outlet adapted for transmission of fluid pressure to a brake cylinder, and a fluid chamber for providing pressure communication between said inlet and said outlet;

first means in said chamber having a first valve portion thereon, said means being adapted for movement in response to fluid pressure at said inlet above a first predetermined pressure;

a member of said fluid chamber having a second valve portion thereon cooperating with said first valve portion being adapted for a predetermined movement in response to a second higher predetermined fluid pressure at said inlet.

second means supported by said first means for maintaining said second valve portion spaced from said first valve portion at fluid pressure levels below said first predetermined pressure to provide for fluid communication from said inlet to said outlet, movement of said means at said first predetermined pressure causing engagement at said first valve portion with said second valve portion for interrupting the transmission of full fluid pressure from said inlet and said outlet, said movement of said member preventing engagement of said first valve portion with said second valve portion.

2. A proportioning valve according to claim 1 wherein movement of said member provides a substantially constant offset between said pressure at said inlet and said pressure transmitted to said outlet above said second predetermined fluid pressure at said inlet.

3. A proportioning valve according to claim 1 wherein said housing has means limiting movement of said means in said first chamber in a direction causing said engagement of said first and second valve portions after engagement of said first and second valve portions and wherein said movement of said member is in said direction whereby engagement of said first and second valve portions is prevented by said housing movement limiting means upon predetermined movement of said member in said direction.

4. A proportioning valve according to claim 1 wherein said means in said first chamber has a first total area exposed to fluid pressure at said inlet and a second total area exposed to fluid pressure at said outlet, the ratio of said first and second total area being established so as to provide movement of said first means in response to said fluid pressure at said inlet.

5. A proportioning valve according to claim 4 wherein said second total area is greater than said first total area so that said means moves toward said inlet in response to said fluid pressure at said fluid inlet, and wherein said member is adapted for movement toward said inlet in response to a pressure drop across said member.

6. A proportioning valve according to claim 1 further including means providing a chamber communicating with said outlet which is contractible in response to pressure increases at said inlet and expansible in response to pressure decreases at said inlet, said chamber provides a pressure reduction at said outlet in response to pressure decrease at said inlet above said second predetermined inlet pressure.

7. A proportioning valve according to claim 6 wherein said first mentioned means in said chamber includes a bore communicating with said outlet and said chamber and wherein said chamber means is a resilient member on said means in said chamber.

8. A two stage proportioning valve for use in a vehicle hydraulic brake system comprising:
a housing having fluid inlet adapted to receive fluid from a source of fluid pressure, a fluid outlet adapted for transmission of fluid pressure to a brake cylinder, and a fluid chamber for providing communication between said inlet and said outlet;
differential area means in said chamber, having a first valve portion thereon, sealingly engaging the walls thereof and providing fluid communication from said inlet to said outlet, said differential area means being adapted for movement in response to fluid pressure at said inlet;
resilient means for exerting a force on said differential area means for maintaining said first valve portion in an open condition whereby to provide for fluid communication between said inlet and said outlet at fluid pressure below a first predetermined fluid pressure, said last mentioned means preventing movement of said differential area means below said first predetermined fluid pressure at said inlet and for allowing movement of said differential area means above said first predetermined fluid pressure at said inlet;
a member in said fluid chamber having a second valve portion thereon being adapted for predetermined movement in response to fluid pressure at said inlet;
spacer means supported by said differential area means for maintaining said second valve portion in spaced relationship relative to said first valve means below said first predetermined fluid pressure;
resilient means for exerting a force on said member for providing said predetermined movement of said member above a second higher predetermined pressure at said inlet; and
said movement of said differential area means at said first predetermined pressure causing engagement at said first valve portion with said second valve portion for interrupting the transmission of full fluid pressure from said inlet and said outlet, said movement of said member preventing engagement of said first valve portion with said second valve portion.

9. A proportioning valve according to claim 8 wherein movement of said member provides a substantially constant offset between said pressure at said inlet and said pressure transmitted to said outlet above said second predetermined fluid pressure at said inlet.

10. A proportioning valve according to claim 9 wherein said housing has differential area means limiting movement of said differential area means in said chamber in a direction causing said engagement of said first and second valve portions after engagement of said first and second valve portions and wherein said movement of said member is in said direction whereby engagement of said first and second valve portions is prevented by said housing movement limiting differential area means upon predetermined movement of said member in said direction.

11. A proportioning valve according to claim 8 wherein said differential area means in said chamber has a first total area exposed to fluid pressure at said inlet and a second total area exposed to fluid pressure at said outlet, the ratio of said first and second total areas being established so as to provide movement of said means in response to said fluid pressure at said inlet.

12. A proportioning valve according to claim 11 wherein said second total area is greater than said first total area so that said means moves toward said inlet in response to said fluid pressure at said fluid inlet.

13. A proportioning valve according to claim 12 wherein said member is adapted for movement toward said inlet in response to a pressure drop across said member.

14. A proportioning valve according to claim 8 further including means providing a chamber communicating with said outlet which is contractible in response to pressure increases at said inlet and expansible in response to pressure decreases at said inlet, said chamber providing a pressure reduction at said outlet in response to pressure decrease at said inlet above said second predetermined inlet pressure.

15. A proportioning valve according to claim 14 wherein said first differential area means in said chamber includes a bore communicating with said outlet and said chamber and wherein said chamber means is a resilient member on said means in said chamber.

16. A two stage proportioning valve for use in a vehicle hydraulic brake system comprising:
a housing having fluid inlet adapted to receive fluid from a source of fluid pressure, a fluid outlet adapted for transmission of fluid pressure to a brake cylinder, and a fluid chamber for providing communication between said inlet and said outlet;
differential area means in said chamber, having a first valve portion thereon, sealingly engaging the walls thereof and including a passage providing fluid communication from said inlet to said outlet, said differential area means being adapted for movement in response to fluid pressure at said inlet;

said differential area means in said chamber having a first total area exposed to fluid pressure at said inlet and a second total area exposed to fluid pressure at said outlet, the ratio of said first and second total areas being established so as to provide movement of said means in response to said fluid pressure at said inlet, said second total area being greater than said first total area so that said means moves toward said inlet in response to said fluid pressure at said fluid inlet, resilient means for exerting a force on said differential area means for maintaining said first valve portion in an open condition whereby to provide for fluid communication between said inlet and said outlet at fluid pressure below a first predetermined fluid pressure, said last mentioned means preventing movement of said differential area means below said first predetermined fluid pressure at said inlet and for allowing movement of said differential area means above said first predetermined fluid pressure at said inlet;

a member in said fluid chamber having a second valve portion thereon being adapted for a predetermined movement in response to fluid pressure at said inlet;

resilient means for exerting a force on said member for providing said predetermined movement of said member above a second higher predetermined pressure at said inlet;

spacer means located in said passage of said differential area means for maintaining said second valve portion in spaced relationship relative to said first valve means below said first predetermined fluid pressure;

said movement of said differential area means at said first predetermined pressure causing engagement at said first valve portion with said second valve portion for interrupting the transmission of full fluid pressure from said inlet and said outlet, movement of said member provides a substantially constant offset between said pressure at said inlet and said pressure transmitted to said outlet above said second predetermined fluid pressure at said inlet, with said movement of said member preventing engagement of said first valve portion with said second valve portion, said housing having differential area means limiting movement of said differential area means in said chamber in a direction causing said engagement of said first and second valve portions after engagement of said first and second valve portions and wherein said movement of said member is in said direction whereby engagement of said first and second valve portions is prevented by said housing movement limiting differential area means upon predetermined movement of said member in said direction.

17. The invention as set forth in claim 16 which includes means providing a chamber communicating with said outlet which is contractible in response to pressure increases at said inlet and including a resilient member expansible in response to pressure decreases at said inlet, said chamber providing a pressure reduction at said outlet in response to pressure decrease at said inlet above said second predetermined inlet pressure.

18. A two stage proportioning valve for a vehicle hydraulic brake system to modulate the brake pressure to the rear brakes comprising: a housing having an inlet port adapted to receive fluid from a source of fluid pressure, an outlet port adapted for transmission of fluid pressure to the rear brake cylinders, and a fluid chamber for providing communication between said inlet and outlet ports, said chamber including first and second spaced cylindrical passages at opposite ends thereof; a piston having an end portion supported for reciprocal movement in one of said passages and an opposite end defining a first valve portion, said piston including a bore between said end portions, a spacer member located in the bore of said piston and dimensioned to extend outwardly therefrom, a cap member having an internal passage and slidably located in the other of said passages; a composite member having a second valve portion cooperable with said first valve portion and slidably located in said internal passage of said cap member, said second valve portion being spaced from said first valve portion via abutment with said spacer member during a first predetermined fluid pressure at said inlet; first spring means interposed between said piston and said cap member for locating said first valve portion in spaced relationship relative to said second valve portion at fluid pressures at said inlet below said first predetermined level and responsive to said first predetermined pressure to bias said first valve portion toward said second valve portion; second spring means located in said internal passage of said cap member for urging said second valve portion against said spacer member and responsive to a second higher predetermined pressure level at said inlet to bias said second valve portion away from said first valve portion.

* * * * *